(12) United States Patent
Takatori et al.

(10) Patent No.: US 6,669,593 B2
(45) Date of Patent: Dec. 30, 2003

(54) HYDRAULIC CONTROL SYSTEM FOR AUTOMATIC TRANSMISSION, AND METHOD OF CONTROLLING HYDRAULIC PRESSURE

(75) Inventors: Kazuhiro Takatori, Yokohama (JP); Osamu Sato, Kanagawa (JP); Tatsuya Imamura, Kanagawa (JP); Yasushi Fujita, Kanagawa (JP); Kazuo Tomioka, Shizuoka (JP); Kazuhito Sano, Shizuoka (JP)

(73) Assignee: Jatco LTD, Fuji (JP)

( * ) Notice: Subject to any disclaimer, the term of this patent is extended or adjusted under 35 U.S.C. 154(b) by 0 days.

(21) Appl. No.: 10/050,534

(22) Filed: Jan. 18, 2002

(65) Prior Publication Data

US 2002/0103050 A1 Aug. 1, 2002

(30) Foreign Application Priority Data

Jan. 30, 2001 (JP) .................................. 2001-021651

(51) Int. Cl.⁷ .............................................. F16H 31/00
(52) U.S. Cl. ...................................................... 475/120
(58) Field of Search ................................ 477/143, 148, 477/154; 475/116, 117, 118, 120, 127

(56) References Cited

U.S. PATENT DOCUMENTS

| | | | |
|---|---|---|---|
| 5,741,203 A | * 4/1998 | Nishio | 477/154 |
| 5,743,826 A | * 4/1998 | Usuki et al. | 477/98 |
| 5,941,795 A | 8/1999 | Tsuchiya et al. | 477/148 |
| 6,149,547 A | * 11/2000 | Oba et al. | 477/154 |
| 6,358,184 B1 | * 3/2002 | Steinmetz et al. | 477/143 |

FOREIGN PATENT DOCUMENTS

JP          9-273626          10/1997

* cited by examiner

Primary Examiner—Dirk Wright
(74) Attorney, Agent, or Firm—Foley & Lardner

(57) ABSTRACT

A hydraulic control system controls a hydraulic pressure as a standby pressure in a period from an engagement start point at which an engagement instruction for engaging a friction element is started to an abutment start point at which an abutment between an input element and an output element is started. The hydraulic pressure supplied to at least one friction element is so increased as to switch the friction element from a disengagement state to an engagement state, thus transmitting a revolution of the input element of the friction element to the output element of the friction element. The hydraulic control system includes: a speed sensor for sensing a speed of the friction element; and a standby pressure increase section for increasing the standby pressure in accordance with the speed of the friction element sensed with the speed sensor.

19 Claims, 7 Drawing Sheets

FIG. 2

|  | R/C | H/C | L/C | LR/B | L/OWC | 2-4/B |
|---|---|---|---|---|---|---|
| 1st |  |  | ◯ | (◯) | ◯ |  |
| 2nd |  |  | ◯ |  |  | ◯ |
| 3rd |  | ◯ | ◯ |  |  |  |
| 4th |  | ◯ |  |  |  | ◯ |
| REV. | ◯ |  |  | ◯ |  |  |

HYDRAULIC CONTROL SYSTEM FOR AUTOMATIC TRANSMISSION, AND METHOD OF CONTROLLING HYDRAULIC PRESSURE

BACKGROUND OF THE INVENTION

1. Field of the Invention

The present invention relates to a hydraulic control system for an automatic transmission, and a method of controlling a hydraulic pressure of the automatic transmission. More specifically, the hydraulic control system under the present invention controls, as a standby pressure, a pressure which is supplied to friction elements from a point in time at which an engagement instruction is started to a point in time at which an abutment (an input element abutting on an output element) is started, when at least one of the friction elements is switched from a disengagement state to an engagement state so as to carry out a power train.

2. Description of the Related Art

U.S. Pat. No. 5,941,795 {equivalent of Japanese Patent Unexamined Publication No. Heisei 9(1997)-273626} discloses a hydraulic control system for an automatic transmission. The hydraulic control system according to U.S. Pat. No. 5,941,795 increases a clutch pressure supplied (applied) to a predetermined clutch (friction element), to thereby switch the clutch from a disengagement state to an engagement state. With the switching, the hydraulic control system transmits revolution of an input element to an output element of the clutch. Herein, the hydraulic control system controls the clutch pressure in accordance with operation of the clutch, which clutch pressure is supplied from a point in time at which the engagement instruction is started to a point in time at which the engagement is terminated.

The hydraulic control system according to the related art, however, occasionally causes the following inconvenience when the clutch revolution speed is high:

As is seen in FIG. 8, there is provided a time chart showing schematically an operation of the hydraulic control system, according to the related art. The hydraulic control system switches the clutch from the disengagement state to the engagement state by increasing the clutch pressure P-C supplied (applied) to the clutch. Thereby, a routine of the hydraulic control system carries out an instruction as is indicated with a broken line P-I(0), in accordance with the following three steps:

1. The routine controls the clutch pressure P-C at a pre-charge pressure Pr in a predetermined period from an engagement start point t0 (at which the engagement instruction is started), to thereby shorten the time for charging the clutch with operation fluid.
2. As a standby pressure PS(0), the routine controls the clutch pressure P-C supplied in a period from a termination point t1 (at which the pre-charge pressure control is terminated) to a time point t2 (at which an abutment between the input element and the output element is started). Hereinafter, the time point t2 is referred to as "torque phase start point t2." The routine allows a clutch piston to make a stroke to such an extent that the input element and the output element of the clutch are on the verge of the abutment on each other.
3. The routine makes such an instruction as to increase rapidly (skyrocket) the clutch pressure P-C from the toque phase start point t2. Thereby, the input element abuts on the output element, to thereby engage the clutch.

In the case of the hydraulic control described above, the clutch pressure P-C(Low) at low clutch speed is supplied in a manner indicated with a one-dot chain line in FIG. 8. Moreover, as is indicated by a first region α, the clutch pressure P-C(Low) at low clutch speed causes a surge pressure at the torque phase start point t2.

Contrary to this, in spite of the same instruction pressure P-I(0), the clutch pressure P-C(High) at high clutch speed is supplied in a manner indicated with a two-dot chain line in FIG. 8. More specifically, as compared with the clutch pressure P-C(Low), the clutch pressure P-C(High) is retarded with respect to the instruction pressure P-I(0). In addition, as described above paragraph, when the clutch speed is low, the surge pressure is caused at the torque phase start point t2 (see the first region α). Contrary to this, when the clutch speed is high, the surge pressure is retarded (see a second region β). In addition, the surge pressure at high clutch speed is higher than the surge pressure at low clutch speed. This paraphrases that a small shock is caused when the clutch speed is high.

BRIEF SUMMARY OF THE INVENTION

When a friction element of an automatic transmission is at high revolution speed, speed of supplying operation fluid to the friction element is likely to be retarded.

It is therefore an object of the present invention to provide a hydraulic control system for an automatic transmission preventing such retardation.

According to a first aspect of the present invention, there is provided a hydraulic control system for an automatic transmission. The automatic transmission includes a plurality of friction elements. At least one of the friction elements is supplied with a hydraulic pressure which is so increased as to switch the friction element from a disengagement state to an engagement state, thus transmitting a revolution of an input element of the friction element to an output element of the friction element. The hydraulic control system controls the hydraulic pressure as a standby pressure in a period from an engagement start point at which an engagement instruction for engaging the friction element is started to an abutment start point at which an abutment between the input element and the output element is started. The hydraulic control system comprises: a speed sensor for sensing a speed of the friction element; and a standby pressure increase section for increasing the standby pressure in accordance with the speed of the friction element sensed with the speed sensor.

According to a second aspect of the present invention, there is provided a method of controlling a hydraulic pressure with a hydraulic control system for an automatic transmission. The automatic transmission includes a plurality of friction elements. At least one of the friction elements is supplied with the hydraulic pressure which is so increased as to switch the friction element from a disengagement state to an engagement state, thus transmitting a revolution of an input element of the friction element to an output element of the friction element. The hydraulic control system controls the hydraulic pressure as a standby pressure in a period from an engagement start point at which an engagement instruction for engaging the friction element is started to an abutment start point at which an abutment between the input element and the output element is started. The method of controlling the hydraulic pressure comprises the following steps of: sensing a speed of the friction element with a speed sensor; and increasing the standby pressure, with a standby pressure increase section, in accordance with the speed of the friction element sensed at the sensing step with the speed sensor.

According to a third aspect of the present invention, there is provided a hydraulic control system for an automatic transmission. The automatic transmission includes a plurality of friction elements. At least one of the friction elements is supplied with a hydraulic pressure which is so increased as to switch the friction element from a disengagement state to an engagement state, thus transmitting a revolution of an input element of the friction element to an output element of the friction element. The hydraulic control system controls the hydraulic pressure as a standby pressure in a period from an engagement start point at which an engagement instruction for engaging the friction element is started to an abutment start point at which an abutment between the input element and the output element is started. The hydraulic control system comprises: a sensing means for sensing a speed of the friction element; and an increasing means for increasing the standby pressure in accordance with the speed of the friction element sensed with the sensing means.

The other objects and features of the present invention will become understood from the following description with reference to the accompanying drawings.

BRIEF DESCRIPTION OF THE SEVERAL VIEWS OF THE DRAWINGS

FIG. 2 is a table showing selector gearshifts of the automatic transmission relative to an engagement logic of friction elements;

DETAILED DESCRIPTION OF THE EMBODIMENT

Figure 1:
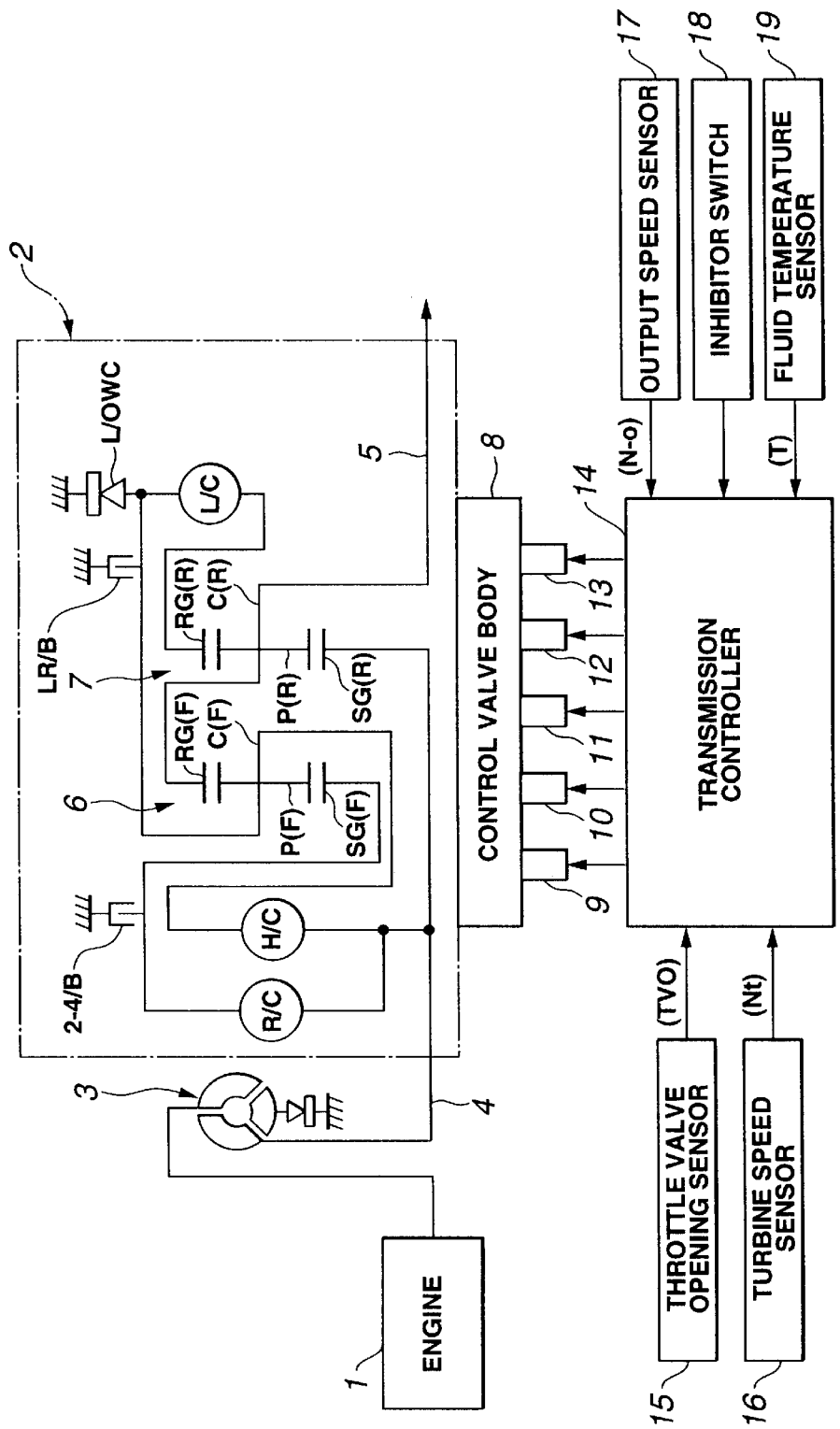
FIG. 1 is a schematic view of a power train and a system for the power train of a vehicle which is equipped with a hydraulic control system for an automatic transmission, under the present invention.

As is seen in FIG. 1, there is provided a power train of a vehicle which is equipped with a hydraulic control system for an automatic transmission, under the present invention. Also shown in FIG. 1 is a control system for the power train. Denoted by reference numeral 1 is an engine, while denoted by reference numeral 2 is an automatic transmission.

The engine 1 has its output speed controlled (increased or decreased) with a throttle valve (not shown) which is interlocked with an accelerator pedal (not shown) operated by a driver. With the driver stepping on the accelerator pedal, the throttle valve is increased in opening from closed state to full-open state (WOT=wide open throttle). The thus outputted engine speed is inputted to an input shaft 4 of the automatic transmission 2 by way of a torque converter 3.

The automatic transmission 2 is provided with a front planetary gear set 6 and a rear planetary gear set 7. The front planetary gear set 6 and the rear planetary gear set 7 are arranged, sequentially from the engine 1, on the input shaft 4 and an output shaft 5. The input shaft 4 and the output shaft 5 are coaxial with each other, and opposed to each other.

A planetary gear mechanism of the automatic transmission 2 is, in principle, constituted of the front planetary gear set 6 and the rear planetary gear set 7.

The front planetary gear set 6 is nearer to the engine 1 than the rear planetary gear set 7.

The front planetary gear set 6 is a simple planetary gear set, and is constituted of a front sun gear SG(F), a front ring gear RG(F), a front pinion P(F), and a front carrier C(F). The front pinion P(F) meshes with the front sun gear SG(F) and the front ring gear RG(F). The front pinion P(F) is supported by the front carrier C(F) in such a manner as to make a revolution.

Likewise, the rear planetary gear set 7 is a simple planetary gear set, and is constituted of a rear sun gear SG(R), a rear ring gear RG(R), a rear pinion P(R), and a rear carrier C(R). The rear pinion P(R) meshes with the rear sun gear SG(R) and the rear ring gear RG(R). The rear pinion P(R) is supported by the rear carrier C(R) in such a manner as to make a revolution.

A transmission path (gear range) of the planetary gear mechanism is determined by friction elements. Included in the friction elements are a low clutch L/C, a 2nd–4th shift brake 2–4/B, a high clutch H/C, a low reverse brake LR/B, a low one-way clutch L/OWC, and a reverse clutch R/C. The above six friction elements are provided relative to elements constituting the front planetary gear set 6 and the rear planetary gear set 7.

More specifically, the front sun gear SG(F) is adapted to be connected to the input shaft 4 by means of the reverse clutch R/C. Moreover, the front sun gear SG(F) is adapted to be fixed by means of the 2nd–4th shift brake 2–4/B.

The front carrier C(F) is adapted to be connected to the input shaft 4 by means of the high clutch H/C. The low one-way clutch L/OWC prevents the front carrier C(F) from rotating in a direction opposite to the engine revolution. Moreover, the front carrier C(F) is adapted to be fixed by means of the low reverse brake LR/B.

Furthermore, the front carrier C(F) and the rear ring gear RG(R) are adapted to be connected to each other by means of the low clutch L/C.

The front ring gear RG(F) and the rear carrier C(R) are connected to each other, and are connected to the output shaft 5. The rear sun gear SG(R) is connected to the input shaft 4.

Figure 2:
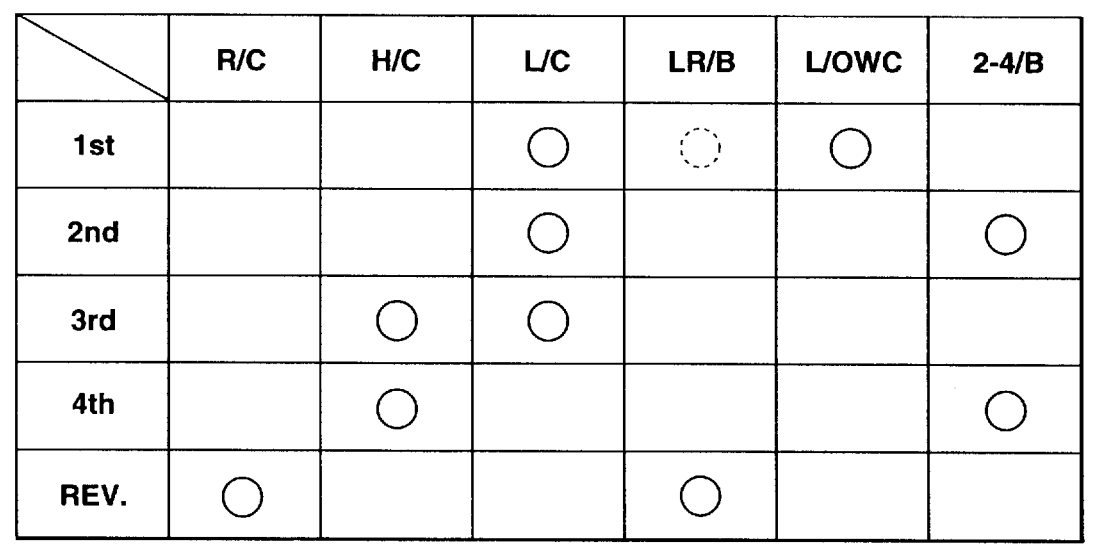

As is seen in FIG. 2, a power transmission of the planetary gear mechanism described above has two functions, that is, a selective hydraulic pressure operation (engagement) and a self engagement. The selective hydraulic pressure operation is indicated by a "solid circle" and is carried out by the low clutch L/C, the 2nd–4th shift brake 2–4/B, the high clutch H/C, the low reverse brake LR/B and the reverse clutch R/C; while the self engagement is indicated by the "solid circle" and is carried out by the low one-way clutch L/OWC. With the selective hydraulic pressure operation and the self engagement, a forward gear range {namely, a first forward shift (1st), a second forward shift (2nd), a third forward shift (3rd), a fourth forward shift (4th)}, and a reverse gear range {reverse shift (Rev.)} are obtained.

A "broken circle" in FIG. 2 indicates a hydraulic pressure operation (engagement) by means of the friction element that should be operated when an engine brake is required.

An engagement logic of the friction elements (the low clutch L/C, the 2nd–4th shift brake 2–4/B, the high clutch H/C, the low reverse brake LR/B, and the reverse clutch R/C) in FIG. 2 is achieved by a control valve body 8 in FIG. 1. The control valve body 8 is provided with at least a line pressure solenoid 9, a low clutch solenoid 10, a 2nd–4th shift brake solenoid 11, a high clutch solenoid 12, a low reverse brake solenoid 13 and the like.

A transmission controller 14 is responsible for duty control of each of the low clutch solenoid 10, the 2nd–4th shift brake solenoid 11, the high clutch solenoid 12, and the low reverse brake solenoid 13.

As is seen in FIG. 1, the transmission controller 14 receives the following five signals:

1) a signal from a throttle valve opening sensor 15 for sensing a throttle valve opening TVO of the engine 1;

2) a signal from a turbine speed sensor 16 for sensing a turbine speed Nt, in other words, the number of output revolutions (hereinafter referred to as "output speed") of the torque converter 3. The output speed of the torque converter 3 is equal to the number of input revolutions (hereinafter referred to as "input speed") of the automatic transmission 2;

3) a signal from an output speed sensor 17 for sensing the number of revolutions N-o (hereinafter referred to as "output speed N-o") of the output shaft 5 of the automatic transmission 2;

4) a signal from an inhibitor switch 17 for sensing a selection range; and 5) a signal from a fluid temperature sensor 19 for sensing an operation fluid temperature T (the operation fluid is supplied to each of the friction elements).

Described sequentially below, for example, is an operation of automatic transmission in a D-range (drive range):

1) The transmission controller 14 carries out a control program (not shown), to thereby search for a preferred gear range which is required for the present driving condition. The preferred gear shift is searched for from the throttle valve opening TVO and the output speed N-o (vehicle speed) of the output shaft 5 of the automatic transmission 2, based on a scheduled transmission map.

2) The transmission controller 14 determines whether or not the gear range presently selected matches the preferred gear range.

3) If determined "not matching" in 2) above, the transmission controller 14 issues an instruction for the preferred gear range.

i) To obtain the preferred gear shift, the transmission controller 14 carries out the duty control of the low clutch solenoid 10, the 2nd–4th shift brake solenoid 11, the high clutch solenoid 12, and the low reverse brake solenoid 13 in such a manner that the friction elements can be switched (engagement state and disengagement state) for an applicable transmission based on the engagement logic in FIG. 2.

ii) The duty control by means of the transmission controller 14 varies pressure of the operation fluid supplied to the applicable friction elements.

Figure 3:
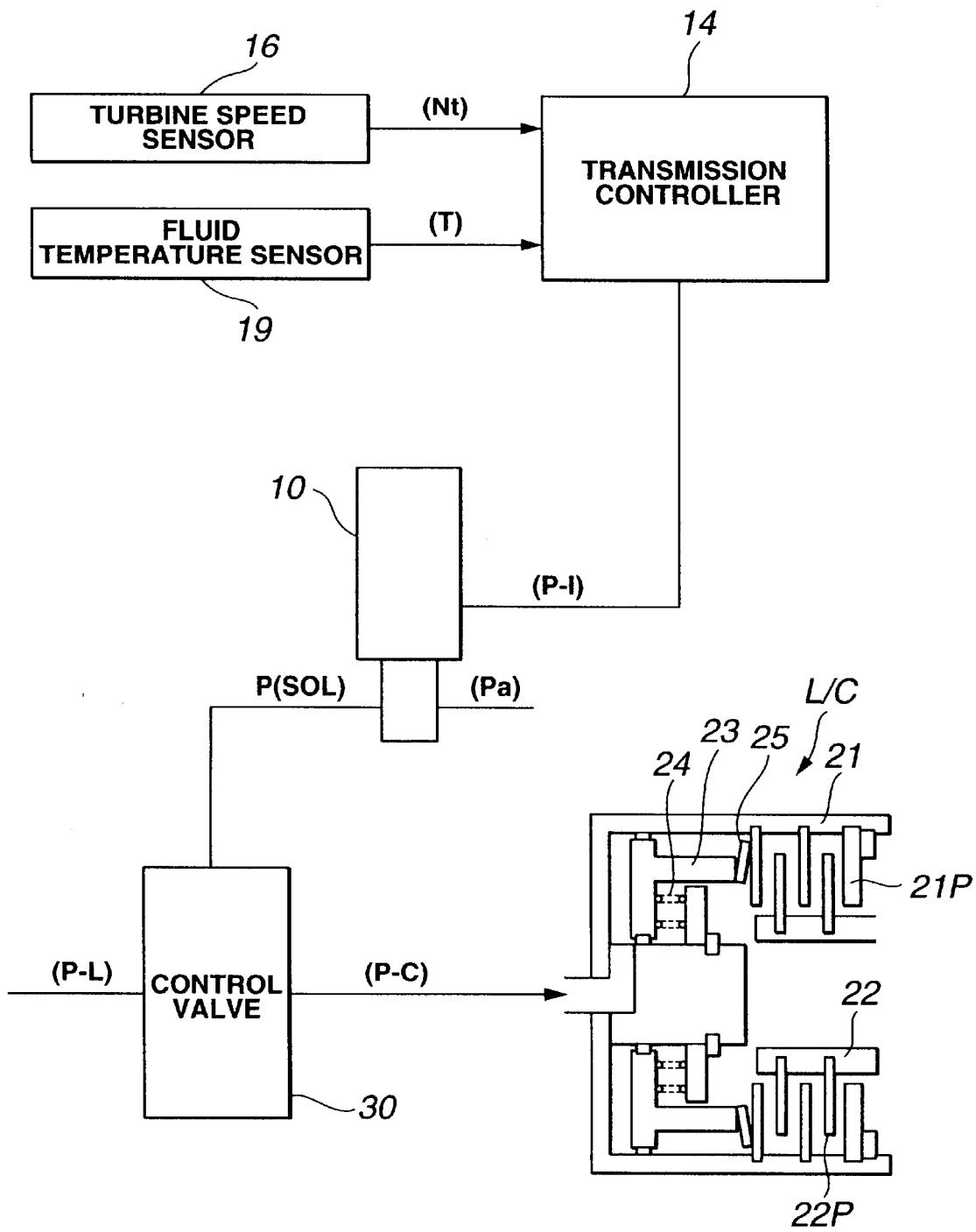
FIG. 3 is a system exemplified by a hydraulic circuit of a low clutch L/C.

As is seen in FIG. 3, there is provided a systematic diagram showing the hydraulic control system for the automatic transmission 2. Shown in FIG. 3 is a hydraulic pressure circuit of the low clutch L/C.

The low clutch L/C has a clutch drum 21 and a clutch hub 22. The clutch drum 21 is an input element of the low clutch L/C, while the clutch hub 22 is an output element of the low clutch L/C. The clutch drum 21 has an input clutch plate 21P, while the clutch hub 22 has an output clutch plate 22P.

Described in this paragraph is in terms of engagement (of the input clutch plate 21P with the output clutch plate 22P): Opposing a force of a return spring 24, a clutch pressure P-C allows a clutch piston 23 to press a dish plate 25. Thereby, the input clutch plate 21P is engaged with the output clutch plate 22P.

Described in this paragraph is in terms of disengagement (of the input clutch plate 21P from the output clutch plate 22P): The clutch pressure P-C is reduced. Thereby, the return spring 24 allows the clutch piston 23 to be spaced apart from the dish plate 25. Thereby, the input clutch plate 21P is disengaged from the output clutch plate 22P.

The clutch pressure P-C is controlled by a control valve 30. The control valve 30 is controlled in accordance with a solenoid pressure P(SOL) from the low clutch solenoid 10 which is controlled (duty control) based on an instruction pressure P-I carried out by the transmission controller 14. Output of the clutch pressure P-C is varied, for example, in a range from 0 to a line pressure P-L. Herein, the line pressure P-L is an initial hydraulic pressure.

Figure 4:
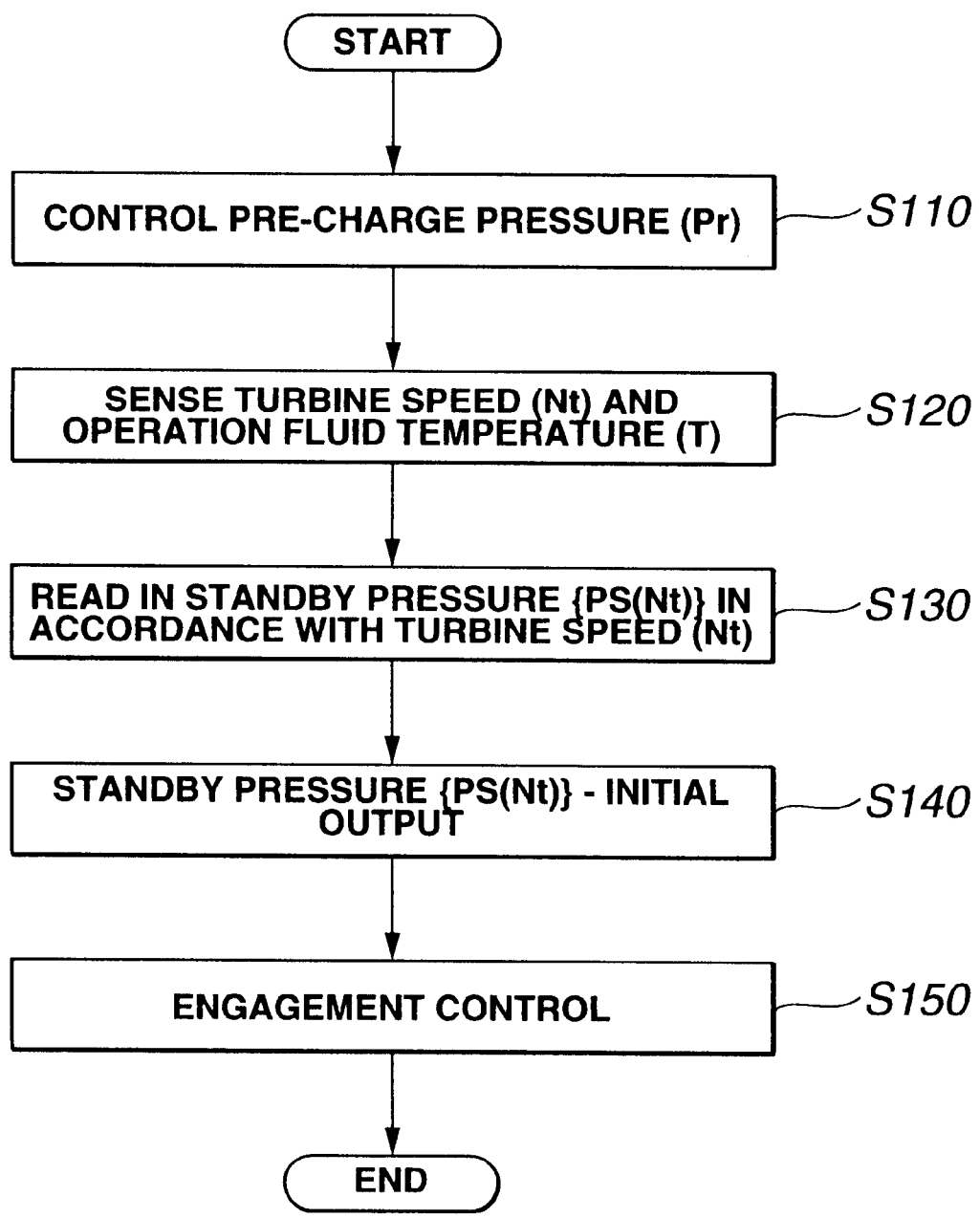
FIG. 4 is a flow chart showing routines so processed with a transmission controller 14 as to engage the low clutch L/C.

As is seen in FIG. 4, there is provided a flow chart showing a hydraulic pressure control carried out in the transmission controller 14 when the low clutch L/C is switched from the disengagement state to the engagement state. The hydraulic pressure control in FIG. 4 is common to upshift and downshift.

Described stepwise below is how to switch the low clutch L/C from disengagement to engagement:

Step 110: A routine carries out an instruction to control the clutch pressure P-C at a pre-charge pressure Pr in a predetermined period from an engagement start point t0 (for starting engagement instruction). When the routine reaches a termination point t1 at which the control of the pre-charge pressure Pr is terminated, the routine proceeds to step 120.

Step 120: The routine senses the input speed of the automatic transmission 2. The thus sensed input speed is regarded as a speed of the low clutch L/C. In other words, the routine senses the turbine speed Nt by means of the turbine speed sensor 16. Moreover, the routine senses the operation fluid temperature T by means of the fluid temperature sensor 19, which operation fluid is supplied to the low clutch L/C. Then, the routine proceeds to step 130.

Step 130: The routine determines a hydraulic pressure correction $\Delta PS$, taking into account the turbine speed Nt (sensed by means of the turbine speed sensor 16) and the operation fluid temperature T (sensed by means of the fluid temperature sensor 19). Adding the hydraulic pressure correction $\Delta PS$ to a conventional standby pressure PS(0) makes a standby pressure PS(Nt), as shown by the following Expression (1):

$$PS(Nt) = PS(0) + \Delta PS \qquad \text{Expression(1)}$$

where the turbine speed Nt and the operation fluid temperature T are not taken into account for the conventional standby pressure PS(0).

Then, the routine reads in the thus obtained standby pressure PS(Nt) as a standby pressure PS in accordance with the turbine speed Nt. Then, the routine proceeds to step 140.

Step 140: The routine carries out an instruction to control the clutch pressure P-C at the standby pressure PS(Nt) until a torque phase start point t2. The torque phase start point t2 is a point in time at which the input clutch plate 21P (of the clutch drum 21) and the output clutch plate 22P (of the clutch hub 22) start abutting on each other. Then, the routine proceeds to step 150.

Step 150: From the torque phase start point t2 on, the routine carries out an instruction to increase rapidly the clutch pressure P-C, to thereby engage the low clutch L/C.

The above summarizes that the standby pressure PS(Nt) is properly increased with a means for increasing standby pressure. The means for increasing the standby pressure is constituted of the turbine speed sensor 16 (means for sensing speed), the fluid temperature sensor 19 (means for sensing fluid temperature), the transmission controller 14 (for carrying out the flow chart in FIG. 4), the low clutch solenoid 10, and the control valve 30. Herein, the low clutch solenoid 10 and the control valve 30 control the clutch pressure P-C supplied (applied) to the low clutch L/C in accordance with the instruction from the transmission controller 14).

Figure 5:
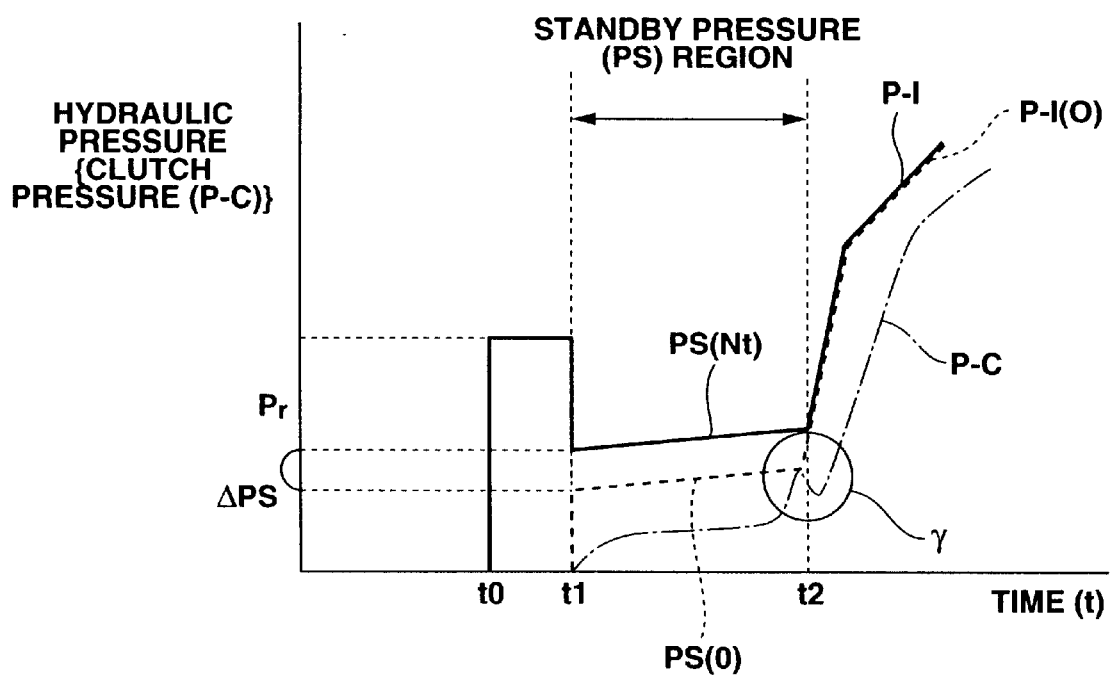
FIG. 5 is a time chart showing an operation of the hydraulic control system in accordance with the flow chart in FIG. 4.

FIG. 5 is a time chart showing an operation of the hydraulic control system under the present invention. A solid line indicates the instruction pressure P-I for controlling the clutch pressure P-C in accordance with the flow chart in FIG. 4. A broken line indicates a conventional instruction pressure P-I(0) to be instructed by a conventional engagement control. A one-dot chain line indicates the clutch pressure P-C generated by the instruction pressure P-I.

As is seen in the time chart in FIG. 5, the hydraulic control system under the present invention takes the following sequential steps:

Step 1: In accordance with the instruction pressure P-I, the routine controls the clutch pressure P-C at the pre-charge pressure Pr in the predetermined period from the engagement start point t0 (for starting engagement instruction), to thereby shorten a time for charging the low clutch L/C with the operation fluid.

Step 2: At the termination point t1, the routine puts termination to controlling the clutch pressure P-C at the pre-charge pressure Pr. From the termination point t1 to the torque phase start point t2, the routine controls the standby pressure PS at the standby pressure PS(Nt) which is higher than the conventional standby pressure PS(0), to thereby further shorten the time for charging the low clutch L/C with the operation fluid. Thereby, the clutch piston 23 (FIG. 3) is allowed to make a stroke to such an extent that the input clutch 21P and the output clutch plate 22P are on the verge of an abutment on each other.

Step 3: In accordance with the instruction pressure P-I, from the torque phase start point t2 the routine carries out an instruction to increase the clutch pressure P-C rapidly in such a manner that the clutch drum 21 abuts on the clutch hub 22, to thereby engage the low clutch L/C.

The hydraulic pressure correction ΔPS described at step 130 in FIG. 4 is determined based on a map loaded in the transmission controller 14. The map is the one having an ordinate showing the hydraulic pressure correction ΔPS (kPa) and an abscissa showing the turbine speed Nt (rpm), as is seen in FIG. 6 and FIG. 7.

Figure 6:
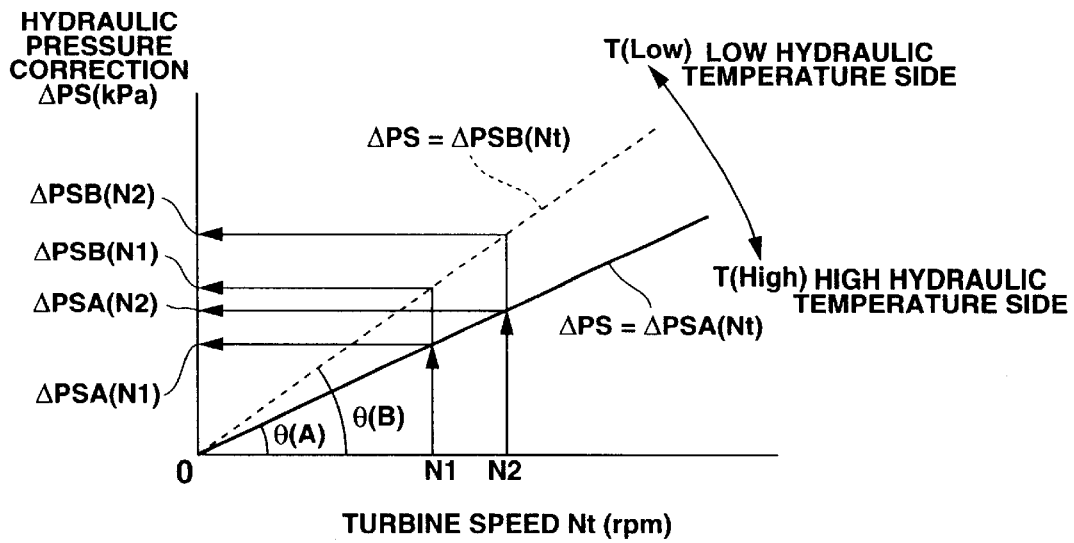
FIG. 6 is a first map which is so designed as to increase a hydraulic pressure correction ΔPS, in accordance with an increase in a turbine speed Nt and a decrease in an operation fluid temperature T.
Figure 7:
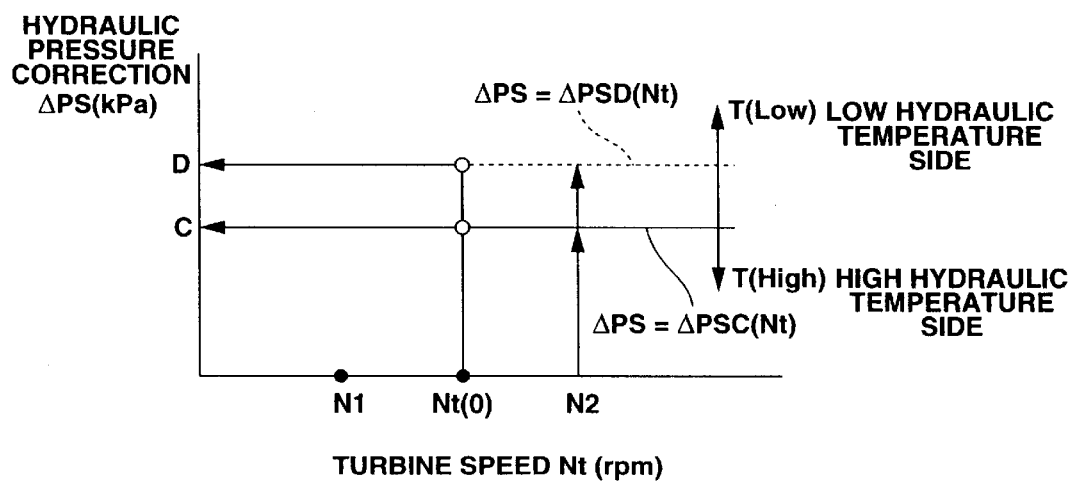
FIG. 7 is a second map which is so designed as to increase a hydraulic pressure correction ΔPS, in accordance with an increase in a turbine speed Nt and a decrease in an operation fluid temperature T.
Figure 8:
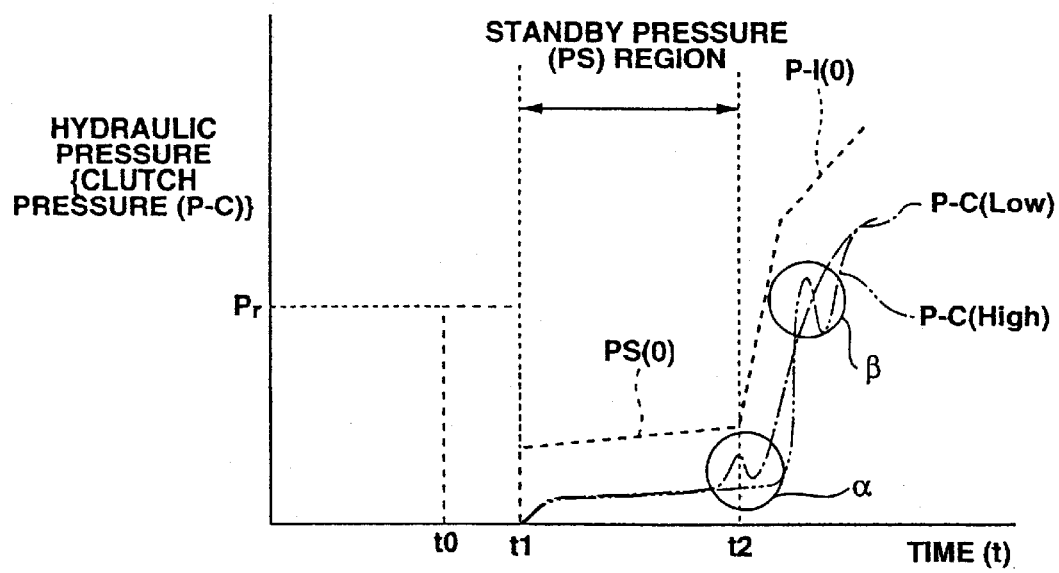
FIG. 8 is a time chart showing an operation of a hydraulic control system, according to a related art.

FIG. 6 shows the map which is so designed as to increase the hydraulic pressure correction ΔPS in accordance with an increase in the turbine speed Nt. The map has the following alternative methods: The first method determines the hydraulic pressure correction ΔPS taking into account the turbine speed Nt only. The second method determines the hydraulic pressure correction ΔPS taking into account the turbine speed Nt and the operation fluid temperature T.

Described hereinafter is a first embodiment of the present invention, taking into account the turbine speed Nt only.

In FIG. 6, the turbine speed sensor 16 senses the turbine speed Nt=N1. For example, as is indicated by a solid line in FIG. 6, the routine determines the hydraulic pressure correction ΔPS=ΔPSA(N1) corresponding to the turbine speed N1, based on a proportional function ΔPS=ΔPSA(Nt). In this case, as is obvious from the hydraulic pressure correction ΔPS=ΔPSA(N2) corresponding to the turbine speed Nt=N2 (>N1), the hydraulic pressure correction ΔPS=ΔPSA(Nt) is increased in accordance with an increase in the turbine speed Nt. Thereby, as is obvious from the Expression (1), the standby pressure PS(Nt) to be instructed (actual instruction) is also increased in accordance with the increase in the turbine speed Nt.

In other words, when only the turbine speed Nt is taken into account, the routine senses the turbine speed Nt. Then, as is seen in the time chart in FIG. 5, from the termination point t1 (at which the control of the pre-charge pressure Pr is terminated) to the torque phase start point t2, the routine increases the conventional standby pressure PS(0) by the hydraulic pressure correction ΔPS {namely, add the hydraulic pressure correction ΔPS to the conventional standby pressure PS(0)}, in accordance with the increase in the turbine speed Nt. Thereby, the routine supplies the low clutch L/C with the standby pressure PS(Nt) {high pressure}, to thereby shorten the time for charging the low clutch L/C with the operation fluid.

The above concludes that the difference, at the torque phase start point t2, between the instruction pressure P-I and the clutch pressure P-C (actually supplied) is reduced, as is seen in the time chart in FIG. 5.

Therefore, according to the first embodiment, the following problem (inconvenience) is solved: The higher the speed of the clutch drum 21 of the low clutch L/C is, the slower (retarded) the supply of the clutch pressure P-C to the low clutch L/C.

In addition, as indicated by a region γ in FIG. 5, a surge pressure of the clutch pressure P-C at the torque phase start point t2 is small, to thereby alleviate a shock attributable to the surge pressure.

Described hereinafter is a second embodiment of the present invention, taking into account the turbine speed Nt and the operation fluid temperature T.

As is seen in FIG. 6, the map is a means for correcting standby pressure. The proportional function is so set up as to rotate around the turbine speed Nt=0 in accordance with the operation fluid temperature T. The thus set up proportional function is loaded in the transmission controller 14, to thereby correct the hydraulic pressure correction ΔPS, taking into account the operation fluid temperature T (namely, a correction in terms of the operation fluid temperature T).

The above is more specifically described as follows: At first, the turbine speed sensor 16 senses the turbine speed Nt=N1, while the fluid temperature sensor 19 senses the operation fluid temperature T.

As the operation fluid temperature T gets higher {for example, T=T(A)}, the hydraulic pressure correction ΔPS (corresponding to the turbine speed Nt and the operation fluid temperature T) is determined by the proportional function {for example, a solid line "ΔPS=ΔPSA(Nt)" having a gradient θ(A)} on a high fluid temperature side T(High).

Contrary to this, as the operation fluid temperature gets lower {for example, T=T(B)}, the hydraulic pressure correction ΔPS (corresponding to the turbine speed Nt and the operation fluid temperature T) is determined by the proportional function {for example, a broken line "ΔPS=ΔPSB(Nt)" having a gradient θ(B) [>θ(A)]} on a low fluid temperature side T(Low).

Herein, the hydraulic pressure correction ΔPS is increased in accordance with the increase in the turbine speed Nt. In addition, the hydraulic pressure correction ΔPS is increased in accordance with decrease in the operation fluid temperature T. The latter is proved by the hydraulic pressure correction ΔPS=ΔPSB(Nt) corresponding to the operation fluid temperature T=T(B) {<T(A)}.

Thereby, as is obvious from the Expression (1), the standby pressure PS(Nt) to be instructed (actual instruction) is increased in accordance with the increase in the turbine speed Nt and the decrease in the operation fluid temperature T.

When the turbine speed Nt and the operation fluid temperature T are taken into account, the above is summarized as follows: The turbine speed Nt and the operation fluid temperature T (which operation fluid is supplied to the low clutch L/C) are sensed. The standby pressure PS(Nt)=PS(0)+ΔPSA(Nt) (increased in accordance with the turbine speed Nt) is corrected to a still higher hydraulic pressure PS(Nt)=PS(0)+ΔPSB(Nt) in accordance with the decrease in the operation fluid temperature T. With the above correction, when the operation fluid temperature T is low (viscosity resistance being increased), the routine supplies the still higher standby pressure PS(Nt) to the low clutch L/C. Thereby, the routine shortens the time for charging the low clutch L/C with the operation fluid.

As a result, according to the second embodiment, shortening the time required for engaging the low clutch L/C is achieved when the operation fluid temperature T is low (viscosity resistance being increased), to thereby accelerate the engagement of the low clutch L/C.

Described hereinafter is a third embodiment of the present invention.

With the hydraulic pressure correction ΔPS (corresponding to the turbine speed Nt and the operation fluid temperature T) as a determinant, the transmission controller 14 (means for determining fluid temperature state) determines whether or not the operation fluid temperature T sensed by means of the fluid temperature sensor 19 is higher than a predetermined fluid temperature T(0).

When the operation fluid temperature T is determined not higher than the predetermined fluid temperature T(0) {for example, T=T(B)}, the standby pressure PS(Nt) in this low fluid temperature state is allowed to be calculated from the hydraulic pressure correction ΔPSB(Nt) determined by the one proportional function {for example, the broken line ΔPS=ΔPSB(Nt)}.

Contrary to the above, when the operation fluid temperature T is determined higher than the predetermined temperature T(0) {for example, T=T(A)}, the standby pressure PS(Nt) in this high fluid temperature state is allowed to be calculated from the hydraulic pressure correction ΔPSA(Nt) which is determined by the one proportional function {for example, the solid line ΔPS=ΔPSA(Nt)}.

In this case, the operation fluid temperature T (which operation fluid is supplied to the low clutch L/C) is determined whether or not higher than the predetermined fluid temperature T(0). In the low fluid temperature state {where the operation fluid temperature T is not higher than the predetermined fluid temperature T(0)}, the standby pressure PS(Nt) increased in accordance with the turbine speed Nt is corrected to the hydraulic pressure PS(Nt)=ΔPS(0)+ΔPSB(Nt) that is higher than the standby pressure PS(Nt)=ΔPS(0)+ΔPSA(Nt). Herein, the standby pressure PS(Nt)=ΔPS(0)+ΔPSA(Nt) has been increased in accordance with the turbine speed Nt in the high fluid temperature state {where the operation fluid temperature T is higher than the predetermined fluid temperature T(0)}. Thereby, constant correction of the standby pressure PS(Nt) in accordance with the operation fluid temperature T is not a must. Therefore, the standby pressure PS(Nt) increased in accordance with the turbine speed Nt is corrected with ease and effectively.

FIG. 7 shows a map in which the transmission controller 14 {means for determining revolution (speed) state} determines whether or not the turbine speed Nt is lower than the predetermined turbine speed N(0), to thereby determine whether the turbine speed Nt is in a high speed state or a low speed state. Based on the determination of the revolution (speed) state, the hydraulic pressure correction ΔPS is increased. In FIG. 7, the map has the following alternative methods. The first method determines the hydraulic pressure correction ΔP taking into account the turbine speed Nt only. The second method determines the hydraulic pressure correction ΔP taking into account the turbine speed Nt and the operation fluid temperature T.

Described hereinafter is a fourth embodiment of the present invention, for determining the hydraulic pressure correction ΔPS, taking into account the turbine speed Nt only.

In FIG. 7, when the transmission controller 14 determines that the turbine speed Nt is not higher than the predetermined turbine speed Nt(0) (for example, turbine speed Nt=N1), the turbine speed Nt is determined to be in the low speed state. In this case, the hydraulic pressure correction ΔPS corresponding to the turbine speed Nt is not calculated (namely, ΔPS=0).

Contrary to the above, when the transmission controller 14 determines that the turbine speed Nt is higher than the predetermined turbine speed Nt(0) (for example, turbine speed Nt=N2), the turbine speed Nt is determined to be in the high speed state. In this case, the hydraulic pressure correction ΔPS corresponding to the turbine speed Nt is, for example, determined to be a constant hydraulic pressure correction ΔPSC(Nt)=C.

The above is summarized as follows: In the high speed state {where the turbine speed Nt is higher than the predetermined turbine speed N(0)}, the hydraulic pressure correction (high speed) ΔPS=C is higher than the hydraulic pressure correction (low speed) ΔPS=0 in the low speed state {where the turbine speed Nt is not higher than the predetermined turbine speed Nt(0)}. Thereby, as is obvious from the Expression (1), the standby pressure PS(Nt) to be instructed (actual instruction) is determined to be one of the following two: PS(Nt)=PS(0), and PS(Nt)=PS(0)+C.

In other words, when only the turbine speed Nt is taken into account, the following steps are taken:

1. The turbine speed Nt is sensed.
2. Then, whether or not the thus sensed turbine speed Nt is higher than the predetermined turbine speed Nt(0) is determined.
3. In the high speed state {where the turbine speed Nt is higher than the predetermined turbine speed Nt(0)}, the standby pressure PS(Nt) (in the high speed state) is made into the standby pressure PS(Nt)=PS(0)+C that is higher than the standby pressure PS(Nt)=PS(0) (low speed) in the low speed state {where the turbine speed Nt is not higher than the predetermined turbine speed Nt(0)}.

Thereby, increasing constantly the standby pressure PS(Nt) in accordance with the turbine speed Nt is not a must. As a result, the standby pressure PS(Nt) is controlled with ease and effectively.

In the above description, the hydraulic pressure correction ΔPS corresponding to the turbine speed Nt is not calculated in the low speed state {where the turbine speed Nt is not higher than the predetermined turbine speed Nt(0)}. This is as a matter of convenience.

However, the hydraulic pressure correction ΔPS corresponding to the turbine speed Nt in the low speed state {where the turbine speed Nt is not higher than the predetermined turbine speed Nt(0)} is allowed to be calculated in the following condition: The hydraulic pressure is lower than the hydraulic pressure correction ΔPS=C in the high speed state {where the turbine speed Nt is higher than the predetermined turbine speed Nt(0)}.

Described hereinafter is a fifth embodiment of the present invention, for determining the hydraulic pressure correction ΔPS, taking into account the turbine speed Nt and the operation fluid temperature T.

The map shown in FIG. 7 is a means for correcting standby pressure. The map is set in a position where the pressure is increased in accordance with the operation fluid temperature T. The thus obtained map is loaded in the transmission controller 14, to thereby correct the hydraulic pressure correction ΔPS, taking into account the operation fluid temperature T.

More specifically, as the operation fluid temperature T moves toward a high fluid temperature side {for example, T=T(C)}, the hydraulic pressure correction ΔPS corresponding to the turbine speed Nt and the operation fluid temperature T is determined to be a constant {for example, a solid line PSC(Nt)=C} which is positioned on the high fluid temperature side T(High) in FIG. 7.

On the other hand, as the operation fluid temperature T moves toward a low fluid temperature side {for example, T=T(D)}, the hydraulic pressure correction ΔPS corresponding to the turbine speed Nt and the operation fluid temperature T is determined to be a constant {for example, a broken line PSD(Nt)=D} which is positioned on the low temperature side T(Low) in FIG. 7.

In this case, the hydraulic pressure correction ΔPS is increased in accordance with the increase in the turbine speed Nt. In addition, the hydraulic pressure correction ΔPS is increased in accordance with the decrease in the operation fluid temperature T. Thereby, as is obvious from the Expression (1), the standby pressure PS(Nt) to be instructed (actual instruction) is increased in accordance with the increase in the turbine speed Nt as well as the decrease in the operation fluid temperature T.

In other words, when the turbine speed Nt and the operation fluid temperature T are taken into account, the turbine speed Nt and the operation fluid temperature T are sensed. The standby pressure PS(Nt)=PS(0)+C (increased in accordance with the turbine speed Nt) is corrected to a still higher hydraulic pressure PS(Nt)=PS(0)+D in accordance with the decrease in the operation fluid temperature T. With the above correction, when the operation fluid temperature T is low (viscosity resistance being increased), the routine supplies the still higher standby pressure PS(Nt) to the low clutch L/C. Thereby, the routine shortens the time for charging the low clutch L/C with the operation fluid.

As a result, according to the fifth embodiment, shortening the time required for engaging the low clutch L/C is achieved when the operation fluid temperature T is low (viscosity resistance being increased), to thereby accelerate the engagement of the low clutch L/C.

Described hereinafter is a sixth embodiment of the present invention.

With the hydraulic pressure correction ΔPS (corresponding to the turbine speed Nt and the operation fluid temperature T) as a determinant, the transmission controller 14 (means for determining fluid temperature state) determines whether or not the operation fluid temperature T sensed by means of the fluid temperature sensor 19 is higher than a predetermined fluid temperature T(0).

When the operation fluid temperature T is determined not higher than the predetermined fluid temperature T(0), for example, T=T(D), the standby pressure PS(Nt) in this low temperature state is allowed to be calculated from the hydraulic pressure correction D which is determined by one predetermined constant {for example, a broken line PSD (Nt)=D}.

Contrary to the above, when the operation fluid temperature T is determined higher than the predetermined fluid temperature T(0), for example T=T(C), the standby pressure PS(Nt) in this high temperature state is allowed to be calculated from the hydraulic pressure correction C which is determined by one predetermined constant {for example, a solid line PSC(Nt)=C}.

In this case, the operation fluid temperature T (which operation fluid is supplied to the low clutch L/C) is determined whether or not higher than the predetermined fluid temperature T(0). In the low temperature state {where the operation fluid temperature T is not higher than the predetermined fluid temperature T(0)}, the standby pressure PS(Nt) increased in accordance with the turbine speed Nt is corrected to the hydraulic pressure PS(Nt)=PS(0)+D that is higher than the standby pressure PS(Nt)=PS(0)+C. Herein, the standby pressure PS(Nt)=PS(0)+C has been increased in accordance with the turbine speed Nt in the high temperature state {where the operation fluid temperature T is higher than the predetermined fluid temperature T(0)}. Thereby, constant correction of the standby pressure PS(Nt) in accordance with the operation fluid temperature T is not a must. Therefore, the standby pressure PS(Nt) increased in accordance with the turbine speed Nt is corrected with ease and effectively.

The construction of the friction elements (in FIG. 3) of the hydraulic control system under the present invention applies not only to the low clutch L/C, but also to the 2nd–4th shift brake 2–4/B, the high clutch H/C, the low reverse brake LR/B, and the reverse clutch R/C. As is seen in FIG. 4, FIG. 6, and FIG. 7, the low clutch solenoid 10, the 2nd–4th shift brake solenoid 11, the high clutch solenoid 12, and the low reverse brake solenoid 13 depressurize the line pressure P-L moving toward the corresponding respective 2nd–4th shift brake 2–4/B, the high clutch H/C, the low reverse brake LR/B, and the reverse clutch R/C. Herein, the depressurization of the line pressure P-L is carried out in accordance with the solenoid pressure which is caused by the duty control with a pilot pressure Pa as an original pressure. The operation fluid pressure of each of the friction elements is controlled individually. As a result, the duty control of each of the low clutch solenoid 10, the 2nd–4th shift brake solenoid 11, the high clutch solenoid 12, and the low reverse brake solenoid 13 achieves the engagement logic of the first shift, the second shift, the third shift, and the fourth shift, as is seen in FIG. 2.

Although the present invention has been described above by reference to six embodiments, the present invention is not limited to the six embodiments described above. Modifications and variations of the embodiments described above will occur to those skilled in the art, in light of the above teachings.

More specifically for example, the standby pressure PS(Nt) according to the six embodiments is defined as a control pressure from the termination point t1 (at which the pre-charge pressure control is terminated) to the torque phase start point t2. According to another embodiment of the present invention, however, the standby pressure PS(Nt) is allowed to be the control pressure ranging more broadly from the engagement start point t0 (at which the engagement instruction is started) to the torque phase start point t2. In this case, the pre-charge pressure Pr is allowed to increase in accordance with the turbine speed Nt from the engagement start point t0 (at which the engagement instruction is started) to the termination point t1 (at which the pre-charge pressure control is terminated).

Furthermore, according to the six embodiments of the present invention, the turbine speed Nt (an input speed of the automatic transmission 2) is sensed, by means of the turbine speed sensor 16, as the speed of the low clutch L/C. Use of the turbine speed sensor 16 (namely, an existing production part) for sensing the speed of the low clutch L/C contributes to easy production (of the hydraulic control system) and low production cost.

The turbine speed sensor 16 is not the one limited sensor for sensing the speed of the low clutch L/C. More specifically, the clutch drum 21 is allowed to have a speed sensor for directly sensing the speed of the low clutch L/C. In addition, the front carrier C(F) or the front sun gear SG(F) is allowed to have a speed sensor for directly sensing the speed of the low clutch L/C.

The entire contents of basic Japanese Patent Application No. P2001-021651 (filed Jan. 30, 2001) of which priority is claimed is incorporated herein by reference.

The scope of the present invention is defined with reference to the following claims.

What is claimed is:

1. A hydraulic control system for an automatic transmission, the automatic transmission including a plurality of friction elements, at least one of the friction elements being supplied with a hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from an engagement start point at which an engagement instruction for engaging the friction element is started to an abutment start point at which an abutment between the input element and the output element is started, the hydraulic control system comprising:

a speed sensor for sensing a speed of the friction element; and a standby pressure increase section for increasing the standby pressure in accordance with the speed of the friction element sensed with the speed sensor, the increase in the standby pressure being continuous from a termination point at which a pre-charge pressure control is terminated to the abutment start point.

2. The hydraulic control system for the automatic transmission as claimed in claim 1, wherein a standby pressure corrector comprises a means for determining fluid temperature state which determines whether the fluid temperature sensed with the fluid temperature sensor is not higher than a predetermined fluid temperature;

wherein the standby pressure includes:
a first standby pressure increased with the standby pressure increase section, the increase of the first standby pressure being made in a high temperature state where the fluid temperature is higher than the predetermined fluid temperature, and
a second standby pressure increased with the standby pressure increase section, the second standby pressure being a hydraulic pressure higher than the first standby pressure; and wherein, in a low temperature state where the means for determining fluid temperature state determines that the fluid temperature is not higher than the predetermined fluid temperature, the standby pressure corrector corrects the standby pressure from the first standby pressure to the second standby pressure.

3. The hydraulic control system for the automatic transmission as claimed in claim 1, wherein the speed sensor senses an input speed of the automatic transmission as the speed of the friction element.

4. The hydraulic control system for the automatic transmission as claimed in claim 1, wherein the plurality of the friction elements includes a low clutch, a 2nd–4th shift brake, a high clutch, a low reverse brake, a low one-way clutch, and a reverse clutch.

5. The hydraulic control system for the automatic transmission as claimed in claim 1, wherein the speed of the friction element has a unit of rpm which stands for revolutions per minute.

6. A hydraulic control system for an automatic transmission, the automatic transmission including a plurality of friction elements, at least one of the friction elements being supplied with a hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from an engagement start point at which an engagement instruction for engaging the friction element is started to an abutment start point at which an abutment between the input element and the output element is started, the hydraulic control system comprising:

a speed sensor for sensing a speed of the friction element; and a standby pressure increase section for increasing the standby pressure in accordance with the speed of the friction element sensed with the speed sensor, wherein the standby pressure increase section comprises:
a means for determining speed state which determines whether the speed of the friction element sensed with the speed sensor is higher than a predetermined speed;

wherein the standby pressure includes:
a first standby pressure in a low speed state where the speed is not higher than the predetermined speed, and
a second standby pressure in a high speed state where the speed is higher than the predetermined speed; and wherein, when the means for determining speed state determines that the speed of the friction element is in the high speed state, the standby pressure is made into the second standby pressure which is a hydraulic pressure higher than the first standby pressure.

7. A hydraulic control system for an automatic transmission, the automatic transmission including a plurality of friction elements, at least one of the friction elements being supplied with a hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from an engagement start point at which an engagement instruction for engaging the friction element is started to an abutment start point at which an abutment between the input element and the output element is started, the hydraulic control system comprising:

a speed sensor for sensing a speed of the friction element; and a standby pressure increase section for increasing the standby pressure in accordance with the speed of the friction element sensed with the speed sensor, wherein the standby pressure includes:

a first standby pressure increased with the standby pressure increase section, and a second standby pressure which is a hydraulic pressure still higher than the first standby pressure; and wherein the hydraulic control system further comprises:

a fluid temperature sensor for sensing a fluid temperature of an operation fluid supplied to the friction element; and a standby pressure corrector for correcting the standby pressure from the first standby pressure to the second standby pressure, the correction with the standby pressure corrector being made in accordance with a decrease in the fluid temperature sensed with the fluid temperature sensor.

8. A method of controlling a hydraulic pressure with a hydraulic control system for an automatic transmission, the automatic transmission including a plurality of friction elements, at least one of the friction elements being supplied with the hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from an engagement start point at which an engagement instruction for engaging the friction element is started to an abutment start point at which an abutment between the input element and the output element is started, the method of controlling the hydraulic pressure comprising the following steps of:

sensing a speed of the friction element with a speed sensor; and increasing the standby pressure, with a standby pressure increase section, in accordance with the speed of the friction element sensed at the sensing step with the speed sensor, the increase in the standby pressure being continuous from a termination point at which a precharge pressure control is terminated to the abutment start point.

9. The method of controlling the hydraulic pressure as claimed in claim 8, wherein the correcting step with the standby pressure corrector comprises the following step of:

determining, with a means for determining fluid temperature state, whether the fluid temperature sensed at the sensing step with the fluid temperature sensor is not higher than a predetermined fluid temperature;

wherein the standby pressure includes:

a first standby pressure increased at the increasing step with the standby pressure increase section the increasing step of the first standby pressure being carried out in a high temperature state where the fluid temperature is higher than the predetermined fluid temperature, and a second standby pressure increased at the increasing step with the standby pressure increase section, the second standby pressure being a hydraulic pressure higher than the first standby pressure; and wherein, in a low temperature state where the means for determining fluid temperature state determines that the fluid temperature is not higher than the predetermined fluid temperature, the standby pressure corrector corrects at the correcting step the standby pressure from the first standby pressure to the second standby pressure.

10. The method of controlling the hydraulic pressure as claimed in claim 8, wherein the speed sensor senses an input speed of the automatic transmission as the speed of the friction element.

11. The method of controlling the hydraulic pressure as claimed in claim 8, wherein the plurality of the friction element elements includes a low clutch, a 2nd–4th shift brake, a high clutch, a low reverse brake, a low one-way clutch, and a reverse clutch.

12. The method of controlling the hydraulic pressure as claimed in claim 8, wherein the speed of the friction element has a unit of rpm which stands for revolutions per minute.

13. A method of controlling a hydraulic pressure with a hydraulic control system for an automatic transmission, the automatic transmission including a plurality of friction elements, at least one of the friction elements being supplied with the hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from an engagement start point at which an engagement instruction for engaging the friction element is started to an abutment start point at which an abutment between the input element and the output element is started, the method of controlling the hydraulic pressure comprising the following steps of:

sensing a speed of the friction element with a speed sensor; and increasing the standby pressure, with a standby pressure increase section, in accordance with the speed of the friction element sensed at the sensing step with the speed sensor, wherein the increasing step with the standby pressure increase section comprises the following step of:

determining, with a means for determining speed state, whether the speed of the friction element sensed with the speed sensor is higher than a predetermined speed;

wherein the standby pressure includes:

a first standby pressure in a low speed state where the speed is not higher than the predetermined speed, and a second standby pressure in a high speed state where the speed is higher than the predetermined speed; and wherein, when the means for determining speed state determines at the determining step that the speed of the friction element is in the high speed state, the standby pressure is made into the second standby pressure which is a hydraulic pressure higher than the first standby pressure.

14. A method of controlling a hydraulic pressure with a hydraulic control system for an automatic transmission, the automatic transmission including a plurality of friction elements, at least one of the friction elements being supplied with the hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from an engagement start point at which an engagement instruction for engaging the friction element is started to an abutment start point at which an abutment between the input element and the output element is started, the method of controlling the hydraulic pressure comprising the following steps of:

sensing a speed of the friction element with a speed sensor; and increasing the standby pressure, with a standby pressure increase section, in accordance with the speed of the friction element sensed at the sensing step with the speed sensor, wherein the standby pressure includes:

a first standby pressure increased at the increasing step with the standby pressure increase section, and a second standby pressure which is a hydraulic pressure still higher than the first standby pressure; and wherein the method of controlling the hydraulic pressure further comprises the following steps of:

sensing, with a fluid temperature sensor, a fluid temperature of an operation fluid supplied to the friction element; and correcting, with a standby pressure corrector, the standby pressure from the first standby pressure to the second standby pressure, the correcting step being made in accordance with a decrease in the fluid temperature sensed at the sensing step with the fluid temperature sensor.

15. A hydraulic control system for an automatic transmission, the automatic transmission including a plurality of friction elements, at least one of the friction elements being supplied with a hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from an engagement start point at which an engagement instruction for engaging the friction element is started to an abutment start point at which an abutment between the input element and the output element is started, the hydraulic control system comprising:

a sensing means for sensing a speed of the friction element; and an increasing means for increasing the standby pressure in accordance with the speed of the friction element sensed with the sensing means, the increase in the standby pressure being continuous from a termination point at which a pre-charge pressure control is terminated to the abutment start point.

16. The hydraulic control system for the automatic transmission as claimed in claim 15, wherein the speed of the friction element has a unit of rpm which stands for revolutions per minute.

17. A hydraulic control system for an automatic transmission, the automatic transmission including a plurality of friction elements, at least one of the friction elements being supplied with a hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from a termination point at which a pre-charge pressure control is terminated to an abutment start point at which an abutment between the input element and the output element is started, the hydraulic control system comprising:

a speed sensor for sensing a speed of the friction element; and a standby pressure increase section for increasing the standby pressure in accordance with the speed of the friction element sensed with the speed sensor, the increase in the standby pressure being continuous from a termination point at which a pre-charge pressure control is terminated to the abutment start point.

18. A method of controlling a hydraulic pressure with a hydraulic control system for an automatic transmission, the automatic transmission including a plurality of friction elements, at least one of the friction elements being supplied with the hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from a termination point at which a pre-charge pressure control is terminated to an abutment start point at which an abutment between the input element and the output element is started, the method of controlling the hydraulic pressure comprising the following steps of:

sensing a speed of the friction element with a speed sensor; and increasing the standby pressure, with a standby pressure increase section, in accordance with the speed of the friction element sensed at the sensing step with the speed sensor, the increase in the standby pressure being continuous from a termination point at which a pre-charge pressure control is terminated to the abutment start point.

19. A hydraulic control system for an automatic transmission, the automatic transmission including a plurality of friction elements, at least one of the friction elements being supplied with a hydraulic pressure which is so increased as to switch the friction element from a disengagement state to an engagement state, thus transmitting a revolution of an input element of the friction element to an output element of the friction element, the hydraulic control system controlling the hydraulic pressure as a standby pressure in a period from a termination point at which a pre-charge pressure control is terminated to an abutment start point at which an abutment between the input element and the output element is started, the hydraulic control system comprising:

a sensing means for sensing a speed of the friction element; and an increasing means for increasing the standby pressure in accordance with the speed of the friction element sensed with the sensing means, the increase in the standby pressure being continuous from a termination point at which a pre-charge pressure control is terminated to the abutment start point.

* * * * *